United States Patent
Stanfield

(10) Patent No.: US 11,390,176 B2
(45) Date of Patent: Jul. 19, 2022

(54) ELECTRIC VEHICLE (EV) FAST RECHARGE STATION AND SYSTEM

(71) Applicant: THE NOCO COMPANY, Glenwillow, OH (US)

(72) Inventor: James Richard Stanfield, Glendale, AZ (US)

(73) Assignee: THE NOCO COMPANY, Glenwillow, OH (US)

(*) Notice: Subject to any disclaimer, the term of this patent is extended or adjusted under 35 U.S.C. 154(b) by 0 days.

(21) Appl. No.: 16/921,029

(22) Filed: Jul. 6, 2020

(65) Prior Publication Data

US 2020/0331354 A1 Oct. 22, 2020

Related U.S. Application Data

(63) Continuation of application No. 16/018,411, filed on Jun. 26, 2018, now Pat. No. 10,730,396, which is a continuation of application No. PCT/US2018/024058, filed on Mar. 23, 2018.

(60) Provisional application No. 62/476,499, filed on Mar. 24, 2017.

(51) Int. Cl.
| | |
|---|---|
| *H02J 7/00* | (2006.01) |
| *B60L 53/10* | (2019.01) |
| *B60L 53/31* | (2019.01) |
| *B60L 50/12* | (2019.01) |
| *H02J 7/02* | (2016.01) |

(52) U.S. Cl.
CPC .............. *B60L 53/11* (2019.02); *B60L 50/12* (2019.02); *B60L 53/31* (2019.02); *H02J 7/0013* (2013.01); *H02J 7/0027* (2013.01); *H02J 7/0042* (2013.01); *H02J 7/02* (2013.01); *H02J 7/022* (2013.01); *B60L 2210/10* (2013.01); *B60L 2210/30* (2013.01); *Y02T 10/70* (2013.01); *Y02T 10/7072* (2013.01); *Y02T 10/72* (2013.01); *Y02T 10/92* (2013.01)

(58) Field of Classification Search
None
See application file for complete search history.

(56) References Cited

U.S. PATENT DOCUMENTS

| 2013/0113413 A1* | 5/2013 | Harty | H01M 10/465 320/101 |
| 2013/0257146 A1* | 10/2013 | Nojima | B60L 53/11 307/9.1 |
| 2014/0167694 A1* | 6/2014 | Gjinali | B60L 53/31 320/109 |

(Continued)

*Primary Examiner* — Robert Grant
(74) *Attorney, Agent, or Firm* — Vorys, Sater, Seymour & Pease LLP; William Klima

(57) ABSTRACT

An electric vehicle (EV) charging station for fast charging (e.g. 5 to 15 minutes) an electric vehicle (EV). The EV charging station can be configured to charge multiple EVs and multiple conventional vehicles at the same time. The EV charging station can include a power source, an electric reservoir receiving power from the power source, an AC to DC power converter for receiving AC power from the power source and converting the AC power to DC power for supplying DC power to the electric reservoir, an EV charger receiving DC power from the electric reservoir; and a first DC to DC converter receiving DC power from the electrical reservoir and converting the DC power to DC power suitable for charging the electrical vehicle.

21 Claims, 8 Drawing Sheets

(56) References Cited

U.S. PATENT DOCUMENTS

2016/0341773 A1* 11/2016 Reineccius ............. H02J 9/062

* cited by examiner

ELECTRIC VEHICLE (EV) FAST RECHARGE STATION AND SYSTEM

FIELD

The present invention is directed to a fast or high speed electric vehicle recharge station and system, for example, for high speed recharging of electrical vehicles (EVs).

BACKGROUND

Electric vehicles (EVs) have grown in use around the world with a strong interest in clean emissions, quiet driving, and low maintenance. Advancements in battery technology have supported improvements in vehicle speed as well as driving distance. Battery charging has improved to help support this growth and provide recharging times as low as two hours for a complete charge of large EV batteries (e.g. as in Chevrolet Volt or Tesla Model S). The push to improve recharge times has driven battery manufacturers to improve technology and provide "fast charge" capability in their batteries. The goal is to allow EV cars to recharge in close to the same time as refueling a gasoline vehicle (e.g. 10-15 minutes).

A problem arises with fast recharging of large vehicle batteries because of the large amount of AC Power required from the utility power grid for each (or multiple) vehicle(s) during recharge. For example, a normal size sedan such as a Chevrolet Volt could require power as high as 350 KW during the recharge process to achieve targeted recharge times. This power requirement when multiplied by several vehicles being charged simultaneously would require a huge AC Power source (such as utility power grid infrastructure to support a large industrial load, followed by AC/DC conversion) at the refueling site. This type of AC Power source is not available in most locations. The power surges during refueling also cause problems with the utility companies' ability to predict power requirements in specific locations. Adding to this particular problem is the sparse locations of recharge stations. EV recharge pumps must be available at a normal gas station to allow the EV market to grow.

SUMMARY

To provide sufficient power at most locations, power must be stored in a controlled, even manner using a large "electrical reservoir" or "battery reservoir" or "energy reservoir". This electrical or battery or energy reservoir can then be used as the main recharge energy source for refueling the vehicles. Battery technology already exists to support the "reservoir" requirement. Several different battery technologies could be used including Flow Batteries and Lithium Batteries. Other electromechanical technologies such as flywheel energy storage may also be used. The battery or energy reservoir could be placed underground in a similar fashion currently used for storing gasoline in a gas station or it could be placed above ground.

The battery reservoir can be constantly charged in an even manner using power that already exists at a normal gas station. Using this method allows the utility company to predict the power usage and avoid power surges. For example, the battery reservoir can be recharged continuously, intermittently, or in a programmed manner from an electrical power source (e.g. existing power source, new power source, electrical power grid, power transmission line(s), power distribution system, electrical generator, fuel type electrical generator).

The energy stored in the reservoir can now be used as the recharge source for the electric vehicle. A recharge pump, very similar (in physical size and form) to a regular gas pump can be used to make the proper conversion of power required for charging the EV. Since the power source for EV is a DC battery and the Battery Reservoir is a DC battery, the power conversion required could simply be direct or a DC to DC conversion, avoiding the power losses with AC to DC conversions used in most battery chargers today.

The gas station will be able to charge their customers for recharging their EV in a similar manner as they do their gasoline customers. They will be able to work with the utility company on the costs for keeping their Battery Reservoir charged as well as amortize their costs for adding/supporting the Battery Reservoir and EV Chargers or EV Pumps (e.g. electric chargers or outlets). They can then build in profits required and charge the EV customers accordingly. This removes the burden from the utility companies from having to provide industrial sized power grid infrastructure, such as additional towers, power lines, substations, which might be impractical for most locations, or utility grid to vehicle connection, including the required power electronics.

Using a Battery Reservoir approach allows a normal gas station to either convert or simply add an EV Pump (e.g. refueling EV pump) or multiple pumps to provide fast charging of EV(s). This fast charging will allow EV(s) to easily travel across country just like a gasoline fueled vehicle does today, which will allow EV(s) to become more mainstream.

The presently described subject matter is directed to an electric recharge station.

The presently described subject matter is directed to an electric/gas station.

The presently described subject matter is directed to an improved gas station comprising or consisting of both gas pumps and electric pumps.

The presently described subject matter is directed to an electric recharge/gas station comprising or consisting of at least one gas pump and at least one electric pump.

The presently described subject matter is directed to an electric recharge/gas station comprising or consisting of at least one gas pump and at least one electric pump.

The presently described subject matter is directed to an electric recharge/gas station comprising or consisting of at least one gas pump and at least one electric pump, wherein the at least one gas pump is spaced apart a predetermined distance from the at least one electric pump.

The presently described subject matter is directed to an electric recharge/gas station comprising or consisting of at least one gas pump and at least one electric pump, wherein the at least one gas pump and at least one electric pump are a single pump unit.

The presently described subject matter is directed to an electric recharge/gas station comprising or consisting of at least one gas pump and at least one electric pump, wherein the at least one gas pump and at least one electric pump are separate pump units.

The presently described subject matter is directed to an electric recharge/gas station comprising or consisting of multiple gas pumps locate and multiple electric pumps.

The presently described subject matter is directed to an electric recharge/gas station comprising or consisting of multiple gas pumps locate and multiple electric pumps, wherein the gas pumps are located in at least one row and the electric pumps are located in at least one another row.

The presently described subject matter is directed to an electric recharge station comprising or consisting of at least one electrical reservoir.

The presently described subject matter is directed to an electric recharge station comprising or consisting of at least one onsite electrical reservoir.

The presently described subject matter is directed to an electric recharge station comprising or consisting of at least one electrical reservoir located below ground level.

The presently described subject matter is directed to an electric recharge station comprising or consisting of at least one electrical reservoir located above ground level.

The presently described subject matter is directed to a gas/electric recharge station comprising or consisting of at least one electrical reservoir.

The presently described subject matter is directed to a gas/electric recharge station comprising or consisting of at least one onsite electrical reservoir.

The presently described subject matter is directed to a gas/electric recharge station comprising or consisting of at least one electrical reservoir located below ground level.

The presently described subject matter is directed to a gas/electric recharge station comprising or consisting of at least one electrical reservoir located above ground level.

The presently described subject matter is directed to a gas/electric recharge station comprising or consisting of at least one gas tank and at least one electrical reservoir located below ground level.

The presently described subject matter is directed to a gas/electric recharge station comprising or consisting of at least one gas tank and at least one electrical reservoir located below ground level, wherein the at least one gas tank and at least one electrical reservoir are spaced apart at least a predetermined distance.

DETAILED DESCRIPTION

Figure 1:
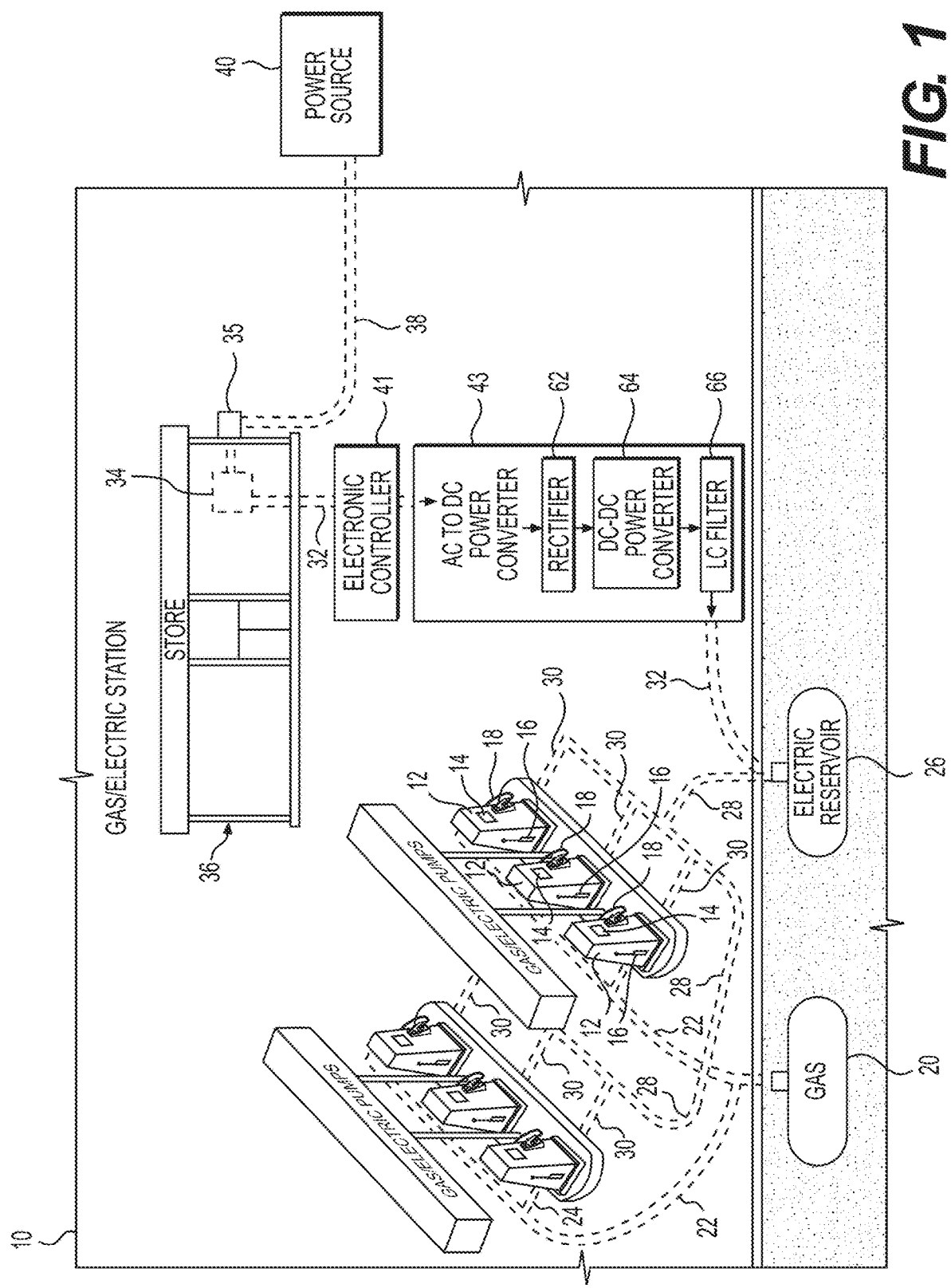
FIG. 1 is a diagrammatic view of a gas/electric station according to the present invention.
Figure 2:
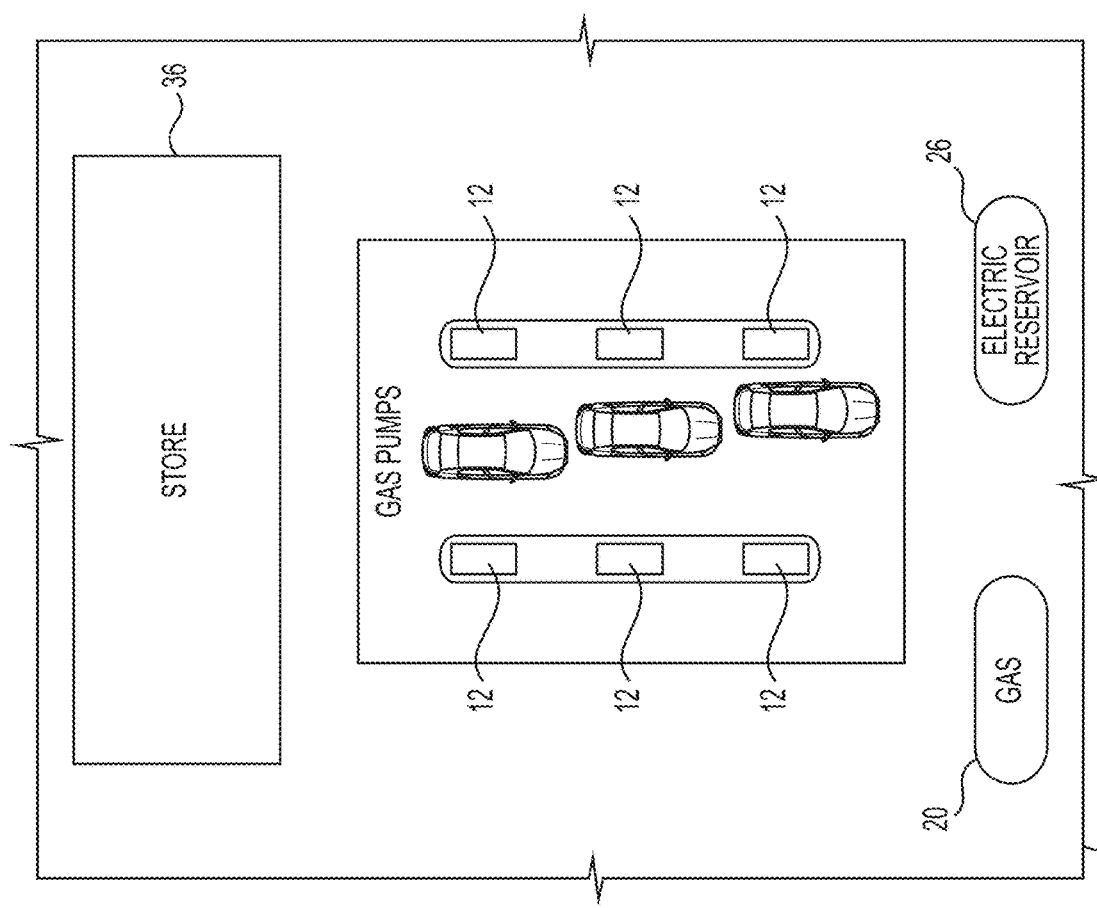
FIG. 2 is another diagrammatic view of the gas/electric station shown in FIG. 1.

A gas/electric station 10 according to the present invention is shown in FIGS. 1 and 2. The gas/electric station 10 is structured, arranged, and designed to both dispense fuel (e.g. gas, diesel, propane) and recharge EVs.

The gas/electric station 10 comprises multiple gas/electric pumps 12. The gas/electric pumps 12 each comprise an electric vehicle charger or EV charger and a fuel pump for refueling a vehicle with fuel (e.g. gasoline, diesel, gas, propane). The gas/electric pumps 12 each can comprise electrical components such as electrical components for charging EVs (e.g. DC-DC converter, battery(ies), Li-ion battery(ies)) and for refueling conventional internal combustion engines (e.g. fuel pump, fuel meter, fuel filter, electrical control), for example, within a housing or compartment(s) of the gas/electric pumps 12.

The gas/electric pumps 12 are shown in FIG. 1 as three (3) gas/electric pumps 12 per row with two (2) rows. However, more or less gas/electric pumps 12 can be provided in the rows, or more or less rows can exist.

Figure 7:
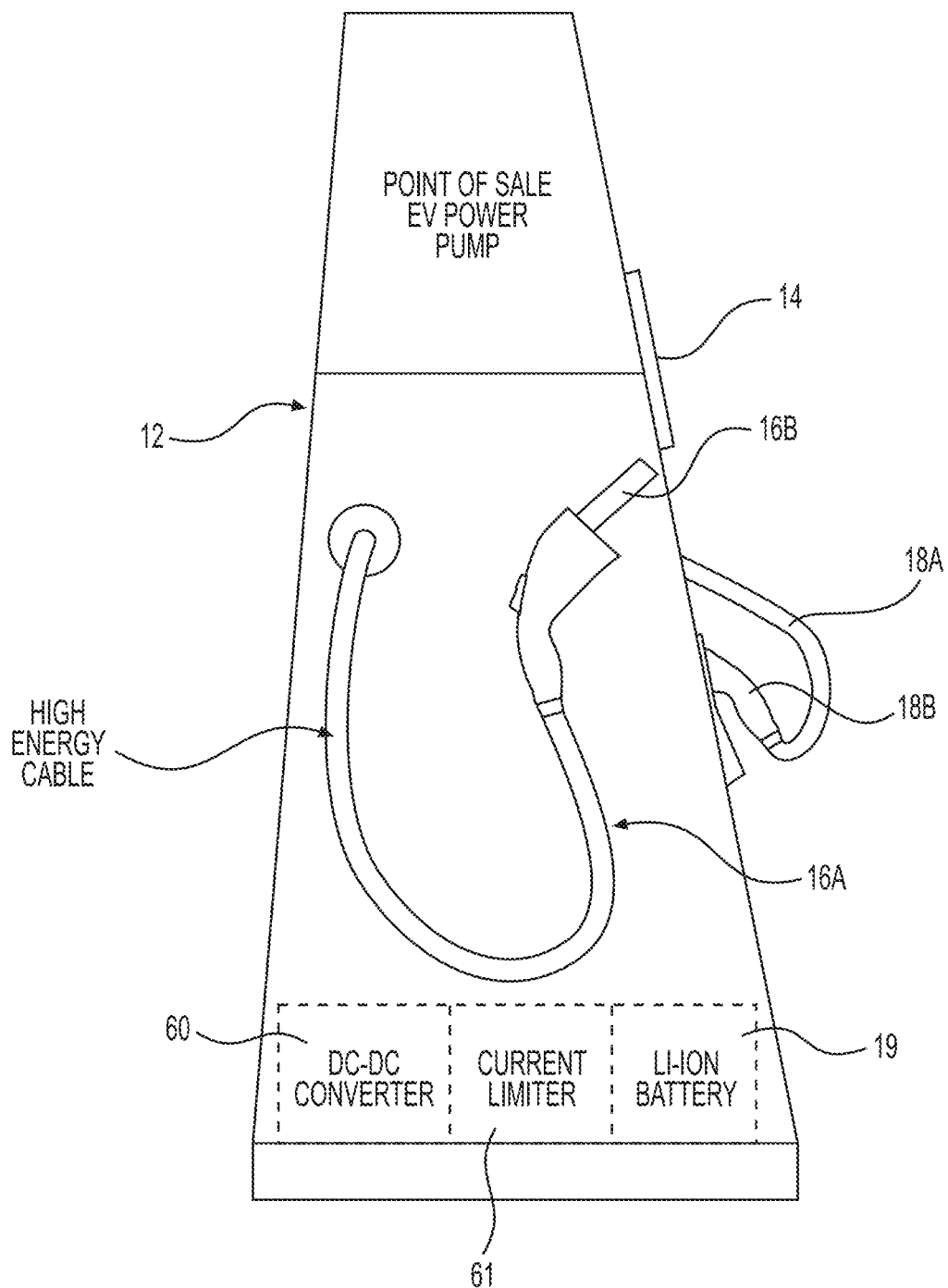
FIG. 7 is a side elevational view of a gas/electric pump according to the present invention.

As shown in FIG. 7, the gas/electric pumps 12 each have a display 14, electric charging cable 16A with an electrical connector 16B configured for EV hook up and recharging, a gas hose 18A fitted with a gas nozzle 18B, a DC-DC converter 60, and an internal Li-ion battery array 19. Alternatively, the gas/electric pumps 12 can be "electric only" or "gas only" pumps, chargers, or devices arranged to provide gas pumps spaced apart from EV chargers at various arrangement and/or locations on the premise of the gas/electric station 10.

Again, the gas/electric pumps 12 shown comprise the components or parts for both pumping gas and EV charging. For example, the gas/electrical pumps 12 can comprise the Li-ion battery(ies) or Li-ion battery array(s) 19, electronic controller configured to control voltage and current supplied by the Li-ion battery array or assembly 19 to the electric vehicle (EV), fuel pump components, and/or safety electronics (e.g. stop all dispensing, stop EV charging, stop fuel pumping, trigger Halon fire system, electrical spark suppression, operational lock out detection and controls for "gas only" filling mode or "electric charging only" charging mode).

Again, the arrangement shown in FIGS. 1 and 2, can be modified with the rows of gas/electric pumps 12 shown replaced with one or more rows of "gas only" pumps and one or more rows of "electric charging only" pumps physically spaced apart and separate same for safety reasons (e.g. to prevent fuel vapor in proximity to electric equipment and potential electrical sparks). However, the gas/electric pumps 12 can be configured or designed to provide electric spark suppression, high level of electrical grounding, redundant electrical grounding, separate compartments or containment structures for separate gas and electric operations, air venting or air or gas (e.g. nitrogen) circulation pumps to allow both gas and electric operations within the same gas/electric pumps 12. Again, the gas/electric pumps 12 can be configured or designed to only allow one mode of operation at a time, for example, with a time pause in-between operations to allow air venting or circulations pumps to remove any remaining fuel or fuel vapor to atmosphere after gas operation mode.

The gas/electric station 10 comprises an underground gas storage tank 20 connected to the individual gas/electric pumps 12 via a main gas supply line 22 connected to and supplying individual gas lines 24 (i.e. gas distribution arrangement and system). The gas/electric station 10 further comprises an underground electrical power reservoir 26 connected to the individual gas/electric pumps 12 via a main power line 28 connected to and supplying individual electric lines 30 (i.e. electric distribution arrangement and system).

The gas/electric station 10 is anticipated to provide high speed recharging of electric vehicles (e.g. configured to recharge electrical vehicles (EVs) in 5 to 15 minutes) in a similar time frame to filling up a vehicle with gas.

The gas/electric station 10 comprises a first electrical power reservoirs (e.g. electric reservoir 26) and a second electrical power reservoirs (e.g. Li-ion battery(ies) locate within the gas/electric pumps 12, as shown in FIGS. 1, 2, and 7). As an alternative to the gas/electric station 10 shown in FIGS. 1 and 2, multiple gas tanks 20 and/or multiple electrical power reservoirs 26 can be provided at the gas/electric station 10 to meet greater and/or peak demands.

The electrical power reservoir 26 can be an apparatus or device configured to store a large amount of electrical power. For example, the electrical power reservoir 26 can be a flow battery and/or Li-ion battery (e.g. banks of batteries). For example, the electrical power reservoir can be a large flow battery connected to a series of Li-ion batteries configured to fast charging of an EV. The electrical power reservoir 26 can be designed, constructed, and sized to accommodate demand modeled based upon the forecasted number of EVs to be recharged on daily, weekly, monthly, and yearly schedules.

The electrical power reservoir 26 is supplied power via underground power line 32 connected to an electrical panel 34, for example, located in store 36. A high power service line 38 supplies power from a power source 40 (e.g. power grid, transmission line, transmission station, generator). A power meter 35 (e.g. located on side of store 36) can be provided to meter the incoming power from the power source 40.

Further, an electronic controller 41 can be provided in the power line 32 for controlling the charging of the electrical power reservoir 26 via the power line 32. For example, the electronic controller 41 can be a component or part of the electrical power reservoir 26 or a separate component or part (e.g. located on the premises of the gas/electric station 10). The electronic controller 41, for example, can be a programmable electronic controller 41.

Figure 3:
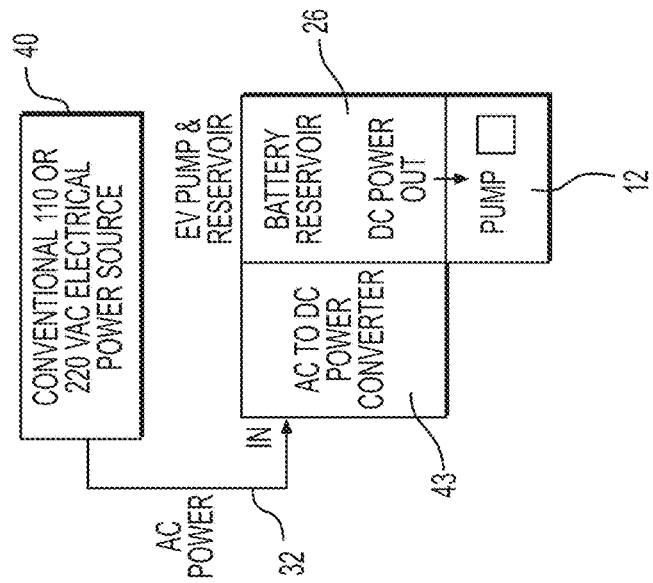
FIG. 3 is a diagrammatic view of the structure and arrangement of the gas/electric station shown in FIG. 1.

In addition, an AC/DC converter 43 can be provided in the power line 32 for converting the incoming AC power into DC power for charging of the electrical power reservoir 26 via the power line 32, as shown in FIGS. 1 and 3. For example, the AC/DC converter 43 can be a component or part of the electrical power reservoir 26 or a separate component or part (e.g. located on the premises of the gas/electric station 10).

The electrical power reservoir 26 can be recharged in various manners. For example, the electrical power reservoir 26 is continuously charged, charged on demand, and/or charged according to a program or algorithm. For example, the charging strategy can be to charge the electrical power reservoir 26 in a manner reducing or minimizing the demand (e.g. avoiding peak demand on the power source 40) while meeting the demand for charging the forecasted number of vehicles throughout the daily schedule. The program or algorithm can be configured to learn and store data on the amount of demand at a given time during each particular day throughout the year, season (e.g. summer, fall, winter, and spring), and holidays to update and improve the forecast for demand in the future.

The charging of the electrical power reservoir 26 can involve continuous charging the electrical power reservoir 26 at an even or varying rate. Alternatively, the electrical power reservoir 26 can be intermittently recharged at a fixed rate, and/or charged at different rates at different period of time. In any event, the intent is to structure and arrange the gas/electric station 10 to provide enough power availability to always meet peak demands for recharging EVs at the gas/electric station 10 while minimizing peak power demands on the power source 40.

Figure 4:
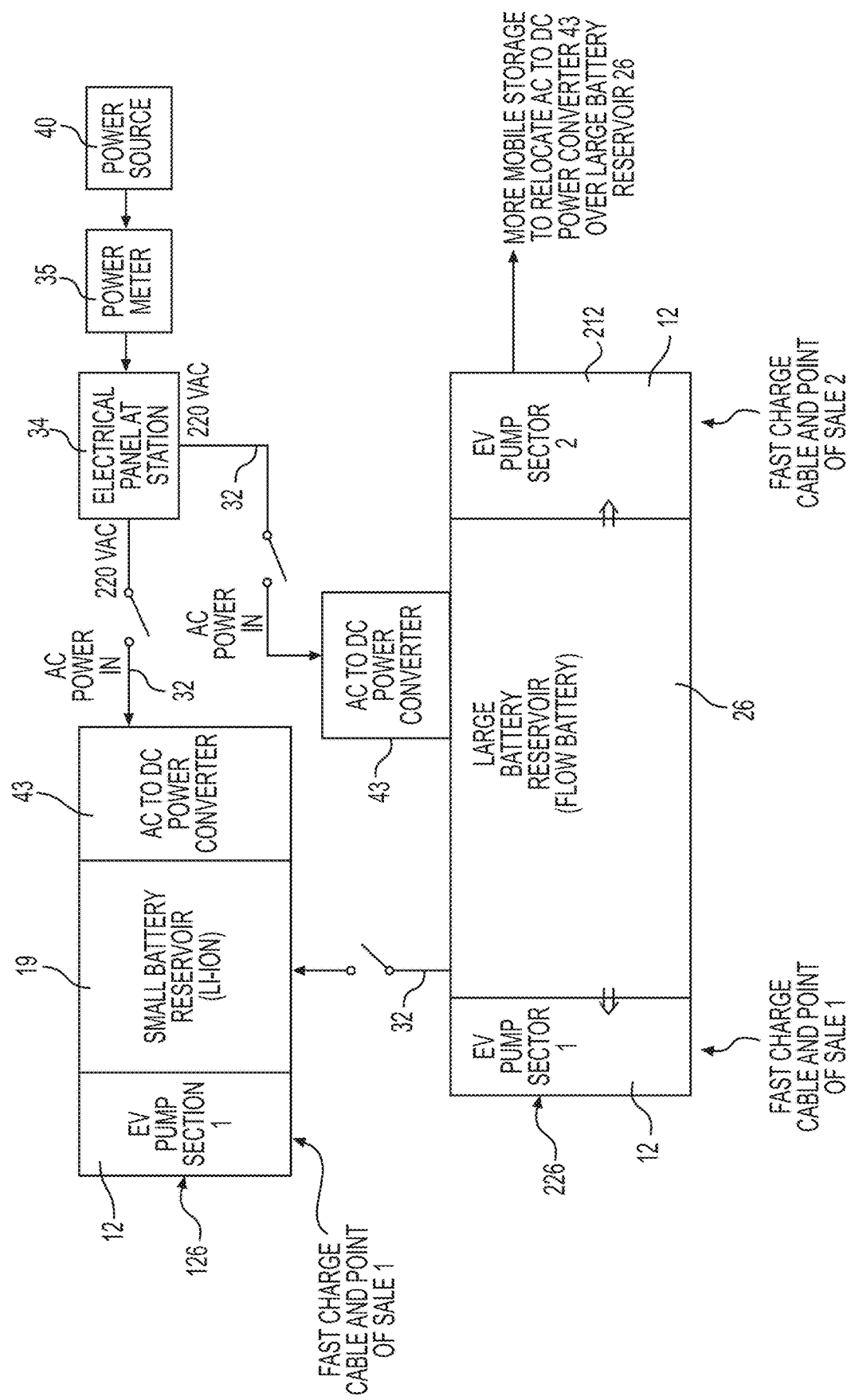
FIG. 4 is a diagrammatic view of the structure and arrangement of a gas/electric station, for example, a portable gas/electric station for use with the gas/electric station shown in FIG. 1, or for use on a lot, for example, at a remote location.

The gas/electric station 10 is shown in FIGS. 1-3, and/or another operation (e.g. lot located at a different location, for example, a remote location) can be fitted with electric units 126, 226, as shown in FIG. 4. The units 126, 226 shown are structured and arranged for providing electric recharging only; however, the units 126, 226 can be modify to provide both gas refueling for conventional vehicles or electric recharging for EVs. The electric units 126, 226 can be connected to and powered, for example, by electric panel 34 of the gas/electric station 10.

The portable version of electric units 126, 226 can be portable electric units. For example, a 20 foot mobile storage container can be fitted with an electric pump 12, and a 40 foot mobile storage container can be fitted with two (2) electric pumps 12. The portable units 126, 226 can be transported to a site (e.g. new station site, local station site, remote station site), and connected up to start operating. The portable version of the electric units 126, 226 can be particularly useful for providing temporary operation, remote operation and provide inexpensive, reusable, or repositionable operation.

Figure 5:
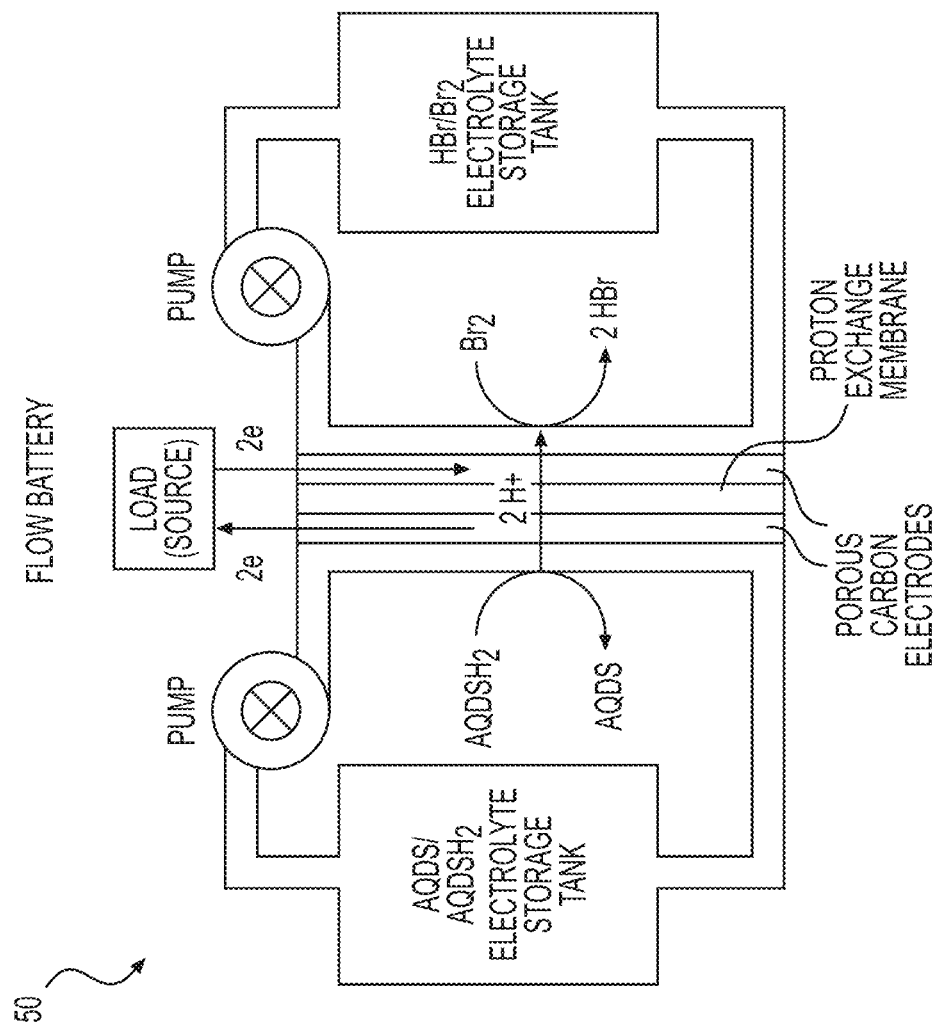
FIG. 5 is a diagrammatic view of a flow battery for use in the stations shown in FIGS. 1-3.

The electric power reservoir 26 shown in FIGS. 1-3, for example, can be a flow battery 50 shown in FIG. 5. Specifically, the flow battery 50 can be structured, configured, and or designed for use as the electric power reservoir 26 in the gas/electric station 10 shown in FIGS. 1-3 or the portable versions of the electric units 126 and 226 shown in FIG. 3.

The flow battery 50 comprises an AQDS/AQDSH electrolyte storage tank having a circulating pump, and an $HBr/Br_2$ electrolyte storage tank having another circulating pump along with a pair of spaced apart porous carbon electrodes separated by a proton exchange membrane. The flow battery 50 is connected to the electrical supply cable 32 (electric source) and the main power supply cables 22 leading to the gas/electric pumps 12 to supply same.

Figure 6:
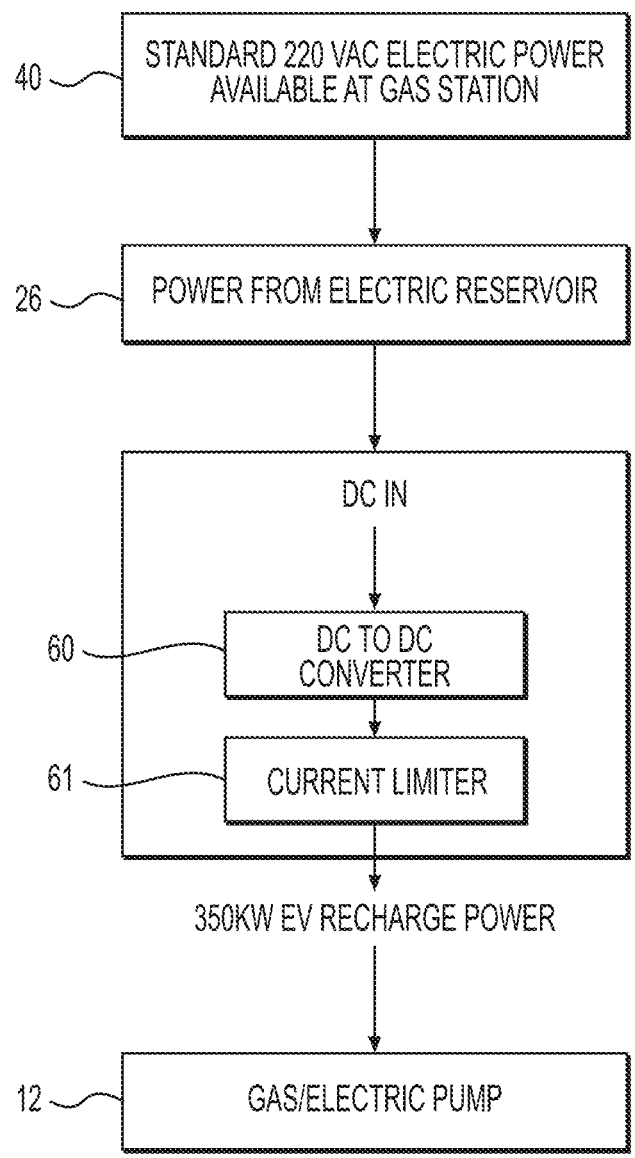
FIG. 6 is a flow chart showing power flow from the electric reservoir (e.g. battery reservoir) to the electric pump (e.g. EV pump, EV recharger).

As shown in FIG. 6, at least one DC to DC converter 60 can receive power from the electric reservoir 26 and then supply power to the gas/electric pumps 12. The converter 60 can be a component or part of the electrical power reservoir 26 and/or a component or part of the gas/electric pumps 12.

Flow Battery

Again, the electric reservoir 26 can be a one or more flow batteries 50. The open circuit voltage of a redox flow battery cell stack is directly proportional to the number of stacks in series, like any other battery.

For charging an EV battery, the voltage provided by the flow battery 50 must be adjustable to the level to which the EV battery needs to be charged to (e.g. may assume several different intermediate levels during the charge process). A properly designed DC-DC converter 60 (e.g. housed in the gas/electric pump 12, as shown in FIG. 7) with appropriate sensing and feedback mechanisms, following the flow battery, provides for the desired voltage to charge the EV battery. For example, Tesla Model S has a battery voltage of approximately 350 Vdc.

The voltage available from the electric reservoir 26 (e.g. flow battery 50) itself will depend on its configuration (i.e. number of cells in a stack, number of stacks in series). For instance, the following has been demonstrated with Vanadium flow batteries installed in 2009, including 3 cell stacks with 40 cells in each stack. The stacks are electrically connected in series, which gives a potential of about 165 V (Rises National Laboratory for Sustainable Energy Report, Rises-R-1753(EN), February 2011, Technical University of Denmark).

This voltage may be increased by adding more cell stacks in series. Another way to increase the voltage to the desired charge level is to use a power electronic boost converter in the DC-DC converter 60 present at the gas/electric pump 12. The choice of topology to get to the desired charge voltage will depend on the economics of each option and the physical space (real estate) required by each option.

The output voltage of the DC-DC converter 60 will depend on the EV model being charged, which may have vastly different battery voltages or charge port form factor. It is conceivable that the DC-DC converter power electronics may be able to provide the required voltage level for a certain range of battery voltages. If the EV battery voltage requirement is beyond what a single DC-DC converter 60 design can provide or an entirely different charge port form factor, then a different pump type 212 will need to be provided, interfacing the same electric reservoir 26 (e.g. flow battery 50).

Any EV battery will need to be charged at a current level recommended by its manufacturer, which must not exceed a maximum current level to protect the EV battery and to limit the voltage drop in the cables connecting to the charge inlet port on the EV. The current limit function in the DC-DC converter 60 will provide that protection. If the output voltage of electric reservoir 26 (e.g. flow battery 50) is higher than the EV battery voltage, then the DC-DC converter 60 will be of the "buck" type, consisting of either MOSFET or IGBT type power electronic switches. Due to the high current involved during fast charging it would be preferred to operate the switches with a low loss switching approach, such as "zero-voltage switching" and synchronous rectification. The DC-DC converter 60 would then simply consist of the power electronic switches arranged in a "half-bridge" followed by a current limiter 61 (e.g. LC filter) to reduce the voltage ripple caused by the power electronic switching mechanism.

If the output voltage of the electric reservoir 26 (e.g. flow battery 50) is lower than or close to the EV battery voltage, then the DC-DC converter 60 will have a first "boost" stage, followed by a "DC link" capacitor, followed by a "buck" stage and the LC filter. The "boost" stage steps up voltage available from the flow battery to a higher voltage, which is then down-converted to the EV battery voltage as required during the charge process. The operation of both the boost and buck stage would again be done while minimizing the losses in the converter.

The AC-DC power converter 43 located after the AC power source 40 supplying the electrical panel 40 or the cable 32 can incorporate a rectifier 62 stage followed by a DC-DC converter 64 stage. The rectifier 62 stage is needed to convert the AC voltage to a DC voltage. The DC-DC converter 64 or converter stage 64 is required to convert the rectified (DC) voltage to the flow battery 26 voltage, as required during its charging process. The rectifier stage is typically of the full bridge "controlled rectifier" type implemented using MOSFET or IGBT type switches. The rectifier stage will be controlled to achieve "power factor correction" on its AC side to meet the power quality requirement set by the utility. The DC-DC converter 64 stage may be a "buck" type or a "boost" followed by a "buck" type, depending on whether the flow battery voltage is lower or higher, respectively, than the rectified voltage. The DC-DC converter 64 stage can include an LC filter 66 to remove the voltage ripple caused by the power electronic switching mechanism. Again, the power electronic switches will need to be operated to minimize the losses.

EV Power Pump High Energy Cable

The high energy cable will be capable of safely delivering 350 KW of power to recharge the vehicle. Large copper cables must be used to manage this much power. The power will be a combination of voltage and current. Electric vehicles today are being built using batteries as high as 350-400 VDC. In the future, this voltage is going to be higher to support longer driving distances as well as faster speeds. The charge currents are expected to be 400-500 amps to provide Fast Charge success.

The charge cable must be made using 0000 AWG (approximately 0.5" diameter) or larger diameter to handle the charge currents required. The interface to the vehicle must be large conductors also. One large cable or two smaller cables can be used to provide the necessary power delivery. The advantage of two cables is they would make it easier to handle between the EV power pump and the EV. The two cables connection can also be used as a safety key for the charging process. More specifically, the EV power pump must detect solid connections of both conductors to enable the charge process to begin. An "electronic safety key/lock" will also be used to insure that the connection to the pump is a valid EV ready to be charged. This safety key can be part of the pumps safety software and the EV must provide a valid response in order for the pump to be enabled. In this way, the pump will never turn high power on to the cables unless it safely and clearly determines that a valid EV is connected and ready to charge.

The conductors between the EV power pump and the EV must be made of highly conductive heavy gauge metal such as copper or silver and must be a low corrosion type. The connectors at the end of the pump cable must not have any exposed metal parts for safety purposes, and if two cables are used the cables must be either interchangeable or must be keyed so they cannot be improperly inserted.

Using high conductive cables and contacts will insure minimum energy losses during the critical charge process. It is very important that maximum energy (power×time) is delivered during the charge process.

Charge interruption safety will also be provided to protect against accidents such as a person trying to drive away during the charge process or even environmental accidents such as earthquakes. An Inhibit signal will be provided from the pump that the EV manufacturer can use to disable the EV from driving during the charge process. But just in case the cable is accidentally pulled out of the pump during the charge process, the pump will detect this condition and shut power off so that it is not available to the outside world.

A master shut off lever will also be provided that turns power off from the Battery Reservoir for safety purposes.

Maximum Power Sharing

Figure 8:
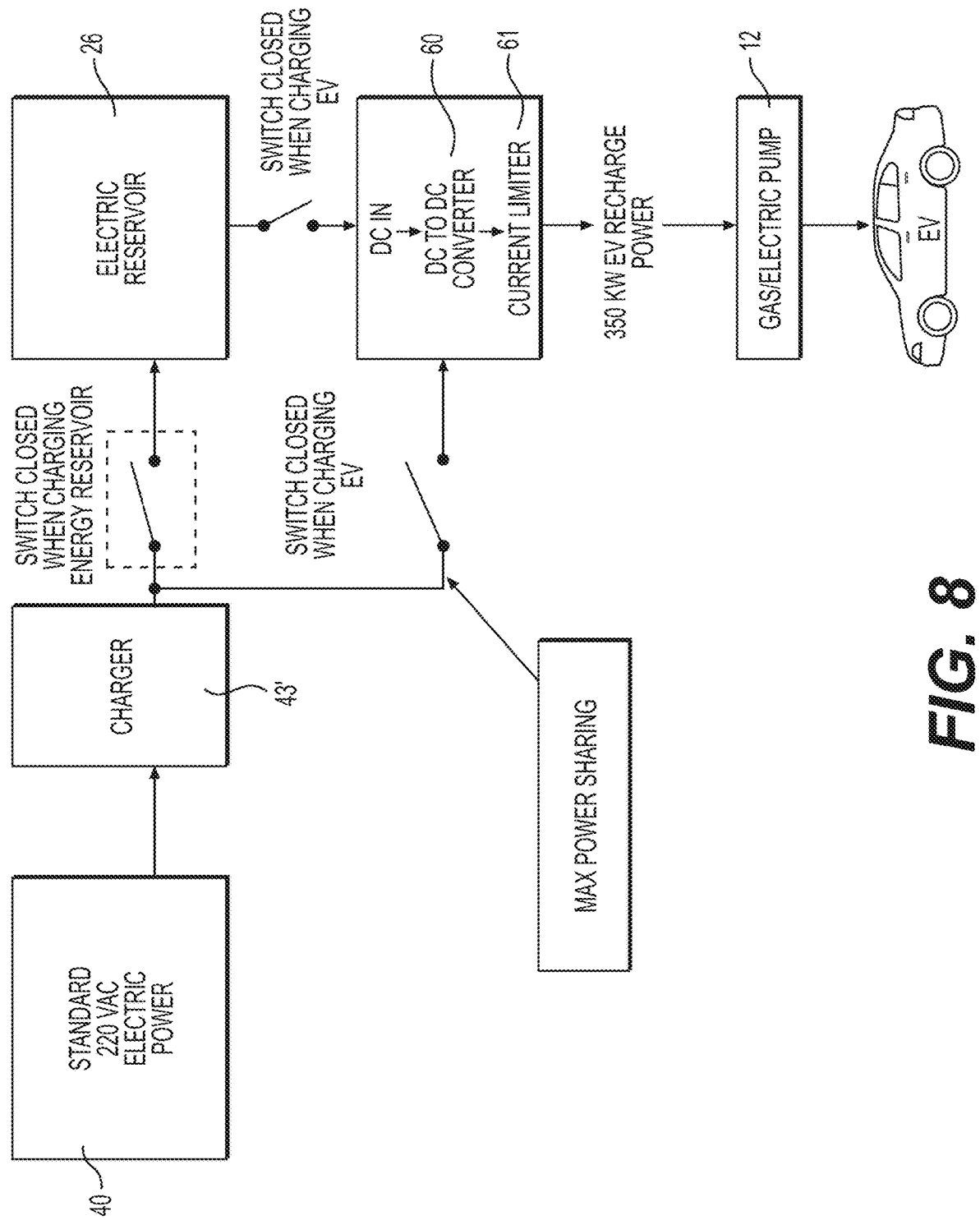
FIG. 8 is a diagrammatic view for power sharing of the charging of an EV from the power source and electric reservoir.

The high speed electric vehicle recharge station and system can include a maximum power sharing function between charging the energy reservoir and charging the EV, as shown in FIG. 8.

If the energy reservoir 26 used is a Redox Flow Battery 50, it cannot be charged while delivering power to the output. This is because the pump flow changes direction accordingly. Because of this limitation, it is possible to utilize the extra power normally being used for charging the Redox Flow Battery to assist in charging the actual EV.

This feature allows for relay switching for selecting a charging target. During the time that there is no EV at the pump, the Redox Battery can be selected and continually charged. As soon as the EV is ready to be charged, the system can switch the selection over to provide maximum charge to the EV by delivering the power that was going to the energy reservoir to the EV.

It is noted that the charger 43' (FIG. 8) can comprise the AC TO DC POWER CONVERTER 43 shown in FIG. 1 along with other electrical components or part to configure the charger 43' for charging the electric reservoir 26. Alternatively, the charge 43' can be a different type of charger compared to the AC TO POWER CONVERTER 43.

Figure 9:
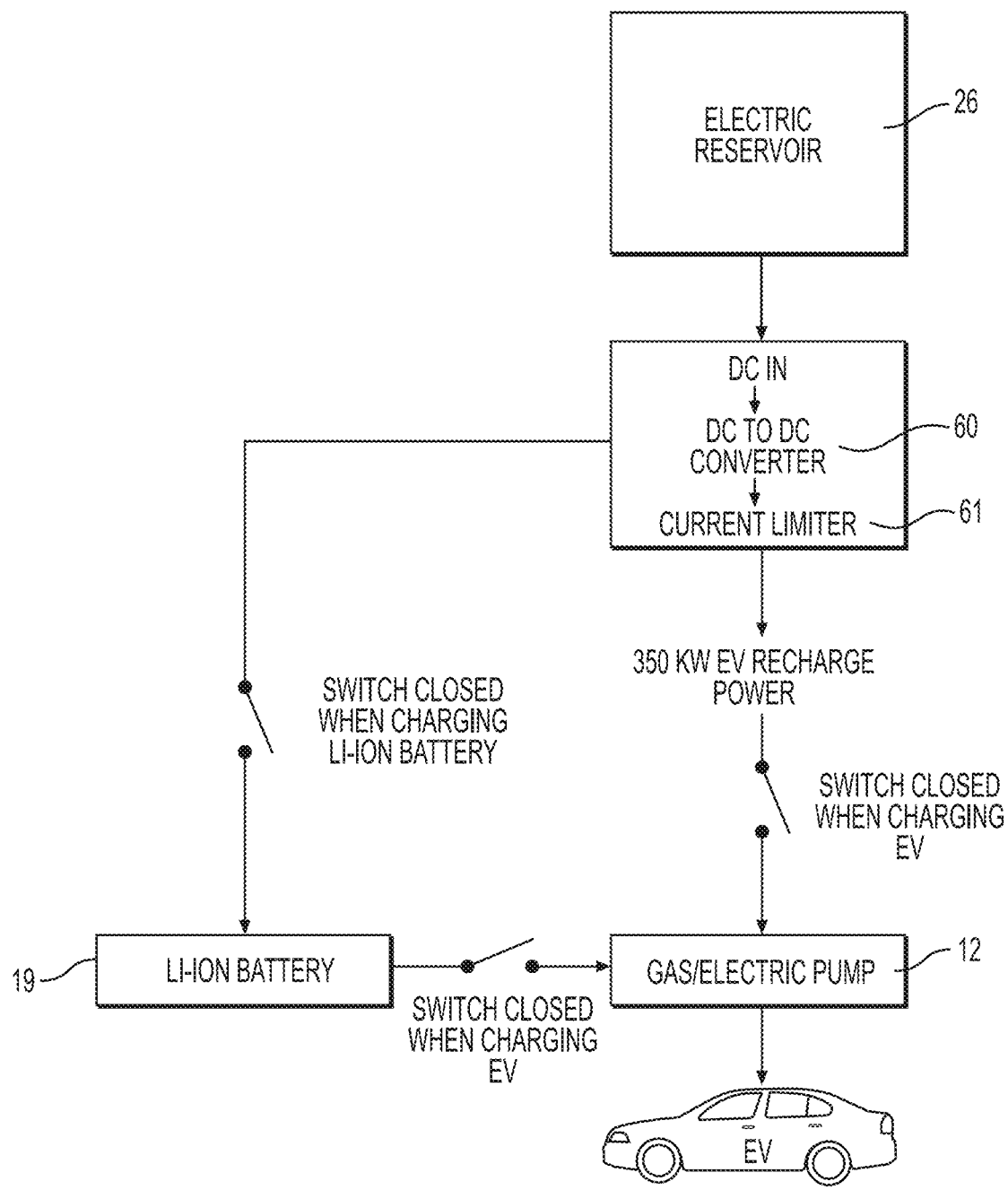
FIG. 9 is a diagrammatic view for power sharing of the charging an EV from the electric reservoir and the Li-ion battery of the gas/electric pump.

This type of feature can be similarly applied to the gas/electric pump 12, as shown in FIG. 9. The DC power from the electric reservoir 26 is directed to the DC-DC converter 60. The DC-DC power from the DC-DC converter 60 can be selectively used to charge the Li-ion battery 19 or can be used to charge the EV being charged by the gas/electric pump 12. Alternatively, power from the DC-DC converter 60 and the Li-ion battery 19 can simultaneously be used to charge the EV due to the switching arrangement shown in FIG. 9.

The features of FIGS. 8 and 9 can be separate or combined together into the gas/electric station 10.

The invention claimed is:

1. An electric vehicle (EV) charging station for charging an electric vehicle (EV), the EV charging station comprising:
   a power source;
   a first electrical power reservoir receiving and storing power from the power source;
   an AC to DC power converter for receiving AC power from the power source and converting the AC power to DC power for supplying DC power to the first electrical reservoir;
   a second electrical power reservoir receiving and storing power from at least one of the power source and the first electrical power reservoir; and
   an EV charger receiving power from at least one of the first electrical power reservoir and the second electrical power reservoir, and charging the electric vehicle.

2. An electric vehicle (EV) charging station for charging an electric vehicle (EV), the EV charging station comprising:
   a power source;
   a first electrical power reservoir receiving and storing power from the power source;
   an AC to DC power converter for receiving AC power from the power source and converting the AC power to DC power for supplying DC power to the first electrical reservoir;
   a second electrical power reservoir receiving and storing power from the power source and the first electrical power reservoir; and
   an EV charger receiving DC power from the first electrical power reservoir and the second electrical power reservoir, and charging the electric vehicle.

3. An electric vehicle (EV) charging station for charging an electric vehicle (EV), the EV charging station comprising:
   a power source;
   a first electrical power reservoir receiving and storing power from the power source;
   an AC to DC power converter for receiving AC power from the power source and converting the AC power to DC power for supplying DC power to the first electrical reservoir;
   a second electrical power reservoir receiving and storing power from the power source or the first electrical power reservoir; and
   an EV charger receiving DC power from the first electrical power reservoir or the second electrical power reservoir.

4. An electric vehicle (EV) charging station for charging an electric vehicle (EV), the EV charging station comprising:
   a power source;
   a first electrical power reservoir receiving and storing power from the power source;
   an AC to DC power converter for receiving AC power from the power source and converting the AC power to DC power for supplying DC power to the first electrical reservoir;
   a second electrical power reservoir receiving and storing power from the power source and/or the first electrical power reservoir; and
   an EV charger receiving DC power from the first electrical power reservoir and/or the second electrical power reservoir.

5. The station according to claim 1, wherein the first electrical power reservoir comprises a flow battery.

6. The station according to claim 1, wherein the first electrical power reservoir comprises a Li-ion battery.

7. The station according to claim 1, wherein the EV charger receives power from the first electrical power reservoir and/or the second electrical power reservoir.

8. The station according to claim 6, wherein the second electrical power reservoir comprises a Li-ion battery.

9. The station according to claim 1, wherein the EV charging station further comprises one or more fuel pumps.

10. The station according to claim 1, wherein the EV charging station is configured for the EV charger to selectively receive power for charging the EV from the first electrical power reservoir or the second electrical power reservoir.

11. The station according to claim 1, wherein the EV charging station is configured for the EV charger to simultaneously receive power for charging the EV from both the first electrical power reservoir and the second electrical power reservoir.

12. The station according to claim 1, further comprising a first DC-DC converter located between the first electrical power reservoir and the EV charger.

13. The station according to claim 1, wherein the station is configured to simultaneously provide power to the first DC-DC converter from the first electrical power reservoir and the power source.

14. The station according to claim 1, further comprising an electronic controller located between the power source and first electrical power reservoir for controlling charging of the first electrical power reservoir.

15. The station according to claim 1, further comprising an EV pump, the EV pump comprising the EV charger and the second electrical power reservoir.

16. The station according to claim 15, wherein the station comprises multiple EV pumps spaced apart and arranged in rows.

17. The station according to claim 15, wherein an EV pump comprises the EV charger and a fuel pump.

18. The station according to claim 15, wherein the EV pump contains the EV charger and the second electrical power reservoir.

19. The station according to claim 15, wherein the station comprises one or more first electrical power reservoirs supplying power to multiple EV pumps each containing at least one of the second electrical power reservoir.

20. The station according to claim 15, wherein 16, wherein the station is configured so that electrical vehicles (EVs) can be located on either side or both sides of the rows when charging one or more electrical vehicles (EVs).

21. The station according to claim 1, wherein the power source is an NC power source.

\* \* \* \* \*